United States Patent
Orii

(10) Patent No.: US 8,954,621 B2
(45) Date of Patent: Feb. 10, 2015

(54) PERIPHERAL, METHOD OF CONTROLLING PERIPHERAL, AND FIRMWARE DOWNLOADING SYSTEM

(75) Inventor: Tsutomu Orii, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 14/342,201

(22) PCT Filed: Aug. 27, 2012

(86) PCT No.: PCT/JP2012/071564
§ 371 (c)(1),
(2), (4) Date: Mar. 3, 2014

(87) PCT Pub. No.: WO2013/031719
PCT Pub. Date: Mar. 7, 2013

(65) Prior Publication Data
US 2014/0223036 A1 Aug. 7, 2014

(30) Foreign Application Priority Data
Sep. 1, 2011 (JP) .................................. 2011-190465

(51) Int. Cl.
G06F 3/00 (2006.01)
G06F 9/44 (2006.01)
G06F 11/00 (2006.01)

(52) U.S. Cl.
CPC ............ G06F 9/4416 (2013.01); G06F 11/004 (2013.01)

USPC .................................. 710/12; 714/11; 714/12

(58) Field of Classification Search
USPC .................................. 710/8, 11, 12
See application file for complete search history.

(56) References Cited

FOREIGN PATENT DOCUMENTS

| JP | 09-223075 A | 8/1997 |
|----|----|----|
| JP | 2004-013782 A | 1/2004 |
| JP | 2004-259224 A | 9/2004 |
| JP | 2007-293514 A | 11/2007 |

OTHER PUBLICATIONS

International Search Report for JP Application PCT/JP2012/071564, date of mailing Oct. 9, 2012, with English translation.

*Primary Examiner* — Ernest Unelus
(74) *Attorney, Agent, or Firm* — Cantor Colburn LLP

(57) ABSTRACT

A peripheral may be connected to a higher-level device. Firmware program data may be downloaded from the higher-level device to the peripheral. The peripheral may include a rewrite control unit for controlling rewriting the program data stored in the peripheral. The program data stored in the peripheral may be rewritten by use of the program data sent from the higher-level device, and then a response, notifying that data rewriting has normally been completed, may be returned to the higher-level device, if the download file includes rewriting permit data. A response, notifying that data rewriting has normally been completed, may be returned to the higher-level device, without rewriting the program data stored in the peripheral by use of the program data sent from the higher-level device, if the download file does not include rewriting permit data.

6 Claims, 6 Drawing Sheets

PERIPHERAL, METHOD OF CONTROLLING PERIPHERAL, AND FIRMWARE DOWNLOADING SYSTEM

CROSS REFERENCE TO RELATED APPLICATIONS

This is the U.S. national stage of application No. PCT/JP2012/071564, filed on Aug. 27, 2012. Priority under 35 U.S.C. §119(a) and 35 U.S.C. §365(b) is claimed from Japanese Application No. 2011-190465, filed Sep. 1, 2011, the disclosure of which is also incorporated herein by reference.

FIELD OF THE INVENTION

At least an embodiment of present invention relates to a peripheral to be connected to a higher-level device, the peripheral being able to download firmware program data, for operating the peripheral, from the higher-level device. Moreover, at least an embodiment of the present invention relates to a method of controlling the peripheral, as well as a firmware downloading system equipped with the higher-level device to which the peripheral can be connected.

BACKGROUND

Conventionally, proposed is a firmware downloading method for downloading firmware program data from a higher-level device to a card reader (for example, refer to Patent Document 1). In the downloading method described in Patent Document 1, a download file including program data is stored in the higher-level device; and if revision information of the download file stored in the higher-level device is not consistent with a response of a revision acquisition command issued by the higher-level device to the card reader, the program data is downloaded from the higher-level device to the card reader.

PATENT DOCUMENT

Patent Document 1; Japanese Unexamined Patent Application Publication 2004-13782

A card reader connected to a higher-level device is sometimes changed from an old model to a new model, in order to improve its function, or in order to cope with a discontinuation of manufacturing a component used in the card reader. In the meantime, there is no guarantee that firmware program data stored in the higher-level device is program data compatible with the new-model card reader. For example, sometimes a new-model card reader may be connected to the higher-level device under conditions where firmware program data stored in the higher-level device is program data compatible with an old-model card reader.

In the case where a new-model card reader is connected to the higher-level device while program data compatible with an old-model card reader is stored in the higher-level device; downloading by means of a downloading method described in Patent Document 1 could lead to a situation where the program data compatible with the old-model card reader is downloaded to the new-model card reader. In other words, depending on the program stored in the higher-level device, there is a possibility that the program data compatible with the old-model card reader is downloaded to the new-model card reader produced either for the purpose of a functional improvement, or in order to cope with a discontinuation of manufacturing a component having been used up to that time; and as a result, despite replacing a card reader connected to the higher-level device with the new-model card reader, it may become impossible to materialize the functional improvement, or to cope with the discontinuation of manufacturing the component having been used up to that time. Moreover, downloading the program data compatible with the old-model card reader to the new-model card reader could lead to a situation where the new-model card reader becomes disabled.

In order to prevent the program data compatible with the old-model card reader from being downloaded to the new-model card reader, it is needed for the new-model card reader only to reject downloading the program data compatible with the old-model card reader, under conditions where the program data compatible with the old-model card reader is stored in the higher-level device. Namely, in response to a downloading command and the like in relation to the program data out of the higher-level device, it is needed for the new-model card reader only to return a rejection response for the downloading. In the meantime, when the new-model card reader turns a rejection response for the downloading, unfortunately there is a possibility that a downloading process at a side of the higher-level device cannot normally finish so that a system including the higher-level device may go down (in other words, the entire system halts its operation).

SUMMARY

Then, at least an embodiment of the present invention to provide a peripheral that makes it possible to prevent a system including the peripheral from being down while preventing program data compatible with an old-model peripheral from being downloaded out of a higher-level device. Moreover, at least an embodiment of the present invention to provide a method of controlling the peripheral, which makes it possible to prevent the system including the peripheral from being down while preventing program data compatible with an old-model peripheral from being downloaded out of the higher-level device. Furthermore, at least an embodiment of the present invention to provide a firmware downloading system equipped with the higher-level device to which the peripheral can be connected.

To bring a solution for the subject described above, a peripheral to be connected to a higher-level device, according to at least an embodiment of the present invention, the peripheral to which firmware program data for operating the peripheral can be downloaded from the higher-level device; characterized in that: the peripheral comprises a rewrite control unit for controlling rewriting the program data stored in the peripheral; in the case where a download file, which includes the program data and is stored in the higher-level device, includes rewriting permit data for making the rewrite control unit permit rewriting the program data stored in the peripheral by use of the program data stored in the higher-level device, the program data stored in the peripheral is rewritten by use of the program data sent from the higher-level device, and then a response, notifying that data rewriting has normally been completed, is returned to the higher-level device; and in the case where the download file does not include the rewriting permit data, a response, notifying that data rewriting has normally been completed, is returned to the higher-level device, without rewriting the program data stored in the peripheral by use of the program data sent from the higher-level device.

In the case of the peripheral according to at least an embodiment of the present invention, if the download file stored in the higher-level device includes the rewriting permit data, the program data stored in the peripheral is rewritten by use of the program data sent from the higher-level device. In the meantime, if the download file does not include the rewriting permit data, the program data stored in the peripheral is not rewritten by use of the program data sent from the higher-level device. Therefore, according to at least an embodiment of the present invention, having the rewriting permit data included in the download file, in which the program data compatible with a new-model peripheral is included, makes it possible to prevent the program data compatible with an old-model peripheral from being downloaded from the higher-level device to the new-model peripheral.

Furthermore, in the case of the peripheral according to at least an embodiment of the present invention, even when the download file does not include the rewriting permit data so that the program data stored in the peripheral is not rewritten by use of the program data sent from the higher-level device, a response, notifying that data rewriting has normally been completed, is returned to the higher-level device. Therefore, even without downloading the program data from the higher-level device to the peripheral, it becomes possible to normally finish a downloading process at a side of the higher-level device. As a result, according to at least an embodiment of the present invention, it becomes possible to prevent the system including the peripheral from being down.

To bring a solution for the subject described above, a method of controlling a peripheral, according to at least an embodiment of the present invention, the peripheral being connected to a higher-level device, the peripheral to which firmware program data for operating the peripheral can be downloaded from the higher-level device; characterized in that: the controlling method comprises: a rewriting permit judgment step for judging whether or not the download file, which includes the program data and is stored in the higher-level device, includes the rewriting permit data for making a permit of rewriting the program data stored in the peripheral by use of the program data stored in the higher-level device; a rewriting step for rewriting the program data stored in the peripheral by use of the program data sent from the higher-level device and returning a response, notifying that data rewriting has normally been completed, to the higher-level device in the case where the download file includes the rewriting permit data at the rewriting permit judgment step; and a pseudo rewriting step for returning a response, notifying that data rewriting has normally been completed, to the higher-level device without rewriting the program data stored in the peripheral by use of the program data sent from the higher-level device in the case where the download file does not include the rewriting permit data at the rewriting permit judgment step.

In the method of controlling a peripheral, according to at least an embodiment of the present invention; at the rewriting permit judgment step, if the download file includes the rewriting permit data, the program data stored in the peripheral is rewritten by use of the program data sent from the higher-level device. In the meantime, at the rewriting permit judgment step, if the download file does not include the rewriting permit data, the program data stored in the peripheral is not rewritten by use of the program data sent from the higher-level device. Therefore, according to at least an embodiment of the present invention, having the rewriting permit data included in the download file, in which the program data compatible with a new-model peripheral is included, makes it possible to prevent the program data compatible with an old-model peripheral from being downloaded from the higher-level device to the new-model peripheral.

Furthermore, in the method of controlling a peripheral, according to at least an embodiment of the present invention; even when the download file does not include the rewriting permit data at the rewriting permit judgment step so that the program data stored in the peripheral is not rewritten by use of the program data sent from the higher-level device, a response, notifying that data rewriting has normally been completed, is returned to the higher-level device at the pseudo rewriting step. Therefore, even without downloading the program data from the higher-level device to the peripheral, it becomes possible to normally finish a downloading process at a side of the higher-level device. As a result, according to at least an embodiment of the present invention, it becomes possible to prevent the system including the peripheral from being down.

At least, one of a peripheral according to at least an embodiment of the present invention and a peripheral controlled by a method of controlling a peripheral, according to at least an embodiment of the present invention, can be used in a firmware downloading system comprising the higher-level device to which the peripheral can be connected. In the firmware downloading system, it becomes possible to prevent the system from being down while preventing program data compatible with an old-model peripheral from being downloaded out of the higher-level device to a new-model peripheral.

In at least an embodiment of the present invention, it is preferable that the rewriting permit data is included in the program data of the download file. According to this configuration, it becomes possible to judge whether or not the download file includes the rewriting permit data, for example, even in the case where the download file does not include the rewrite checking command for judging whether or not the program data stored in the peripheral can be rewritten by use of the program data stored in the higher-level device, or the peripheral does not accept the rewrite checking command included in the download file.

In at least an embodiment of the present invention, the download file may include a rewrite checking command for determining whether or not the program data stored in the peripheral can be rewritten by use of the program data stored in the higher-level device; and the rewriting permit data may be attached to the rewrite checking command. In this case, for example, the program data does not need to include the rewriting permit data so that a configuration of the program data can be simplified.

In at least an embodiment of the present invention, it is preferable that a second peripheral, which is a model older than the peripheral, can be connected to the higher-level device; and in the second peripheral, the program data stored in the second peripheral is rewritten by use of the program data sent from the higher-level device, without judging whether or not the download file includes the rewriting permit data. According to this configuration, when the program data compatible with a new-model peripheral is stored in the higher-level device, the program data is downloaded from the higher-level device to the second peripheral so that the second peripheral can be operated by used of the program data. In other words, by use of single program data compatible with the new-model peripheral, which is stored in the higher-level device, the peripheral and the second peripheral can be operated.

Furthermore, according to this configuration, in the case where the program data compatible with the second peripheral is stored in the higher-level device, the program data is downloaded to the second peripheral and it is not downloaded to the peripheral. As a result, in this case, it is possible to operate the peripheral by use of the program data compatible with the peripheral, and to operate the second peripheral by use of the program data compatible with the second peripheral. In other words, even if only the program data, being single program data, is stored in the higher-level device, it becomes possible to appropriately operate the peripheral and the second peripheral.

As a result, according to this configuration, the higher-level device does not need to have any modification being dependent on whether the peripheral or the second peripheral is connected to the higher-level device. Therefore, convenience of a user using the downloading system can be enhanced.

As described above, in the peripheral, the method of controlling the peripheral and the firmware downloading system, according to at least an embodiment of the present invention; it becomes possible to prevent the system including the peripheral from being down while preventing program data compatible with the old-model peripheral from being downloaded out of the higher-level device to the new-model peripheral.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DESCRIPTION OF EMBODIMENTS

Embodiments of the present invention are described below with reference to the accompanying drawings.

(Configuration of Firmware Downloading System)

Figure 1:
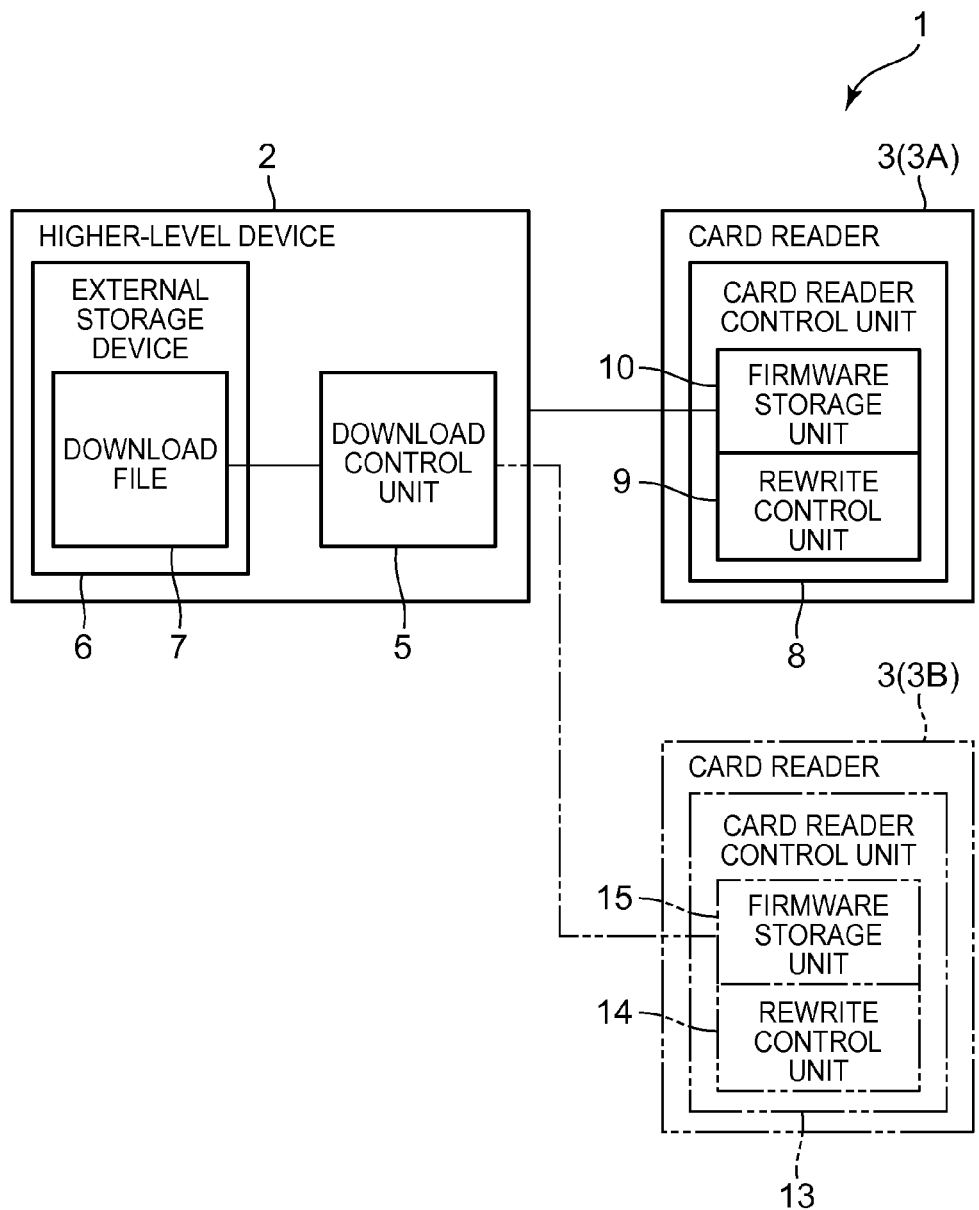
FIG. 1 is a block diagram showing a general configuration of a firmware downloading system according to an embodiment of the present invention.
Figure 2:
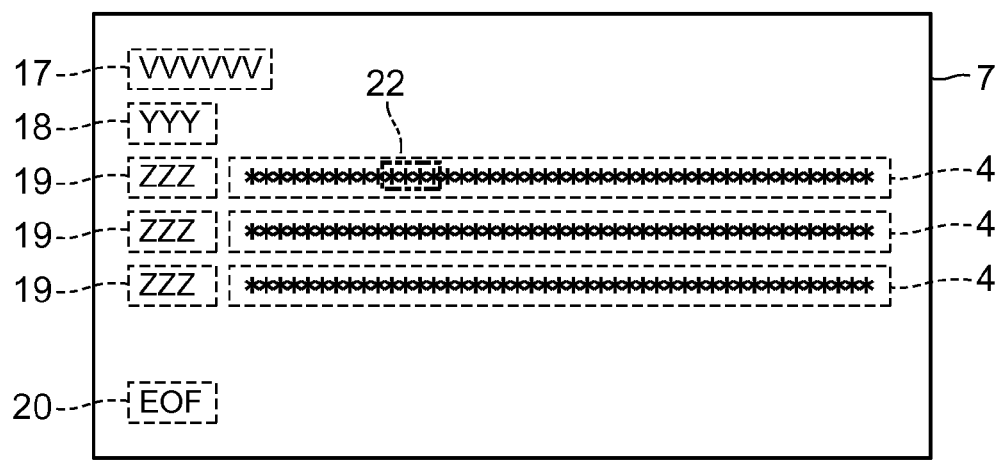
FIG. 2 is a conceptual diagram showing an example of a data structure of a download file stored in a higher-level device shown in FIG. 1.

FIG. 1 is a block diagram showing a general configuration of a firmware downloading system 1 according to an embodiment of the present invention. FIG. 2 is a conceptual diagram showing an example of a data structure of a download file 7 stored in a higher-level device 2 shown in FIG. 1. FIG. 3 is a conceptual diagram for explaining combination patterns of a card reader 3 connected to the higher-level device 2, shown in FIG. 1, and the download file 7 stored in the higher-level device 2.

A firmware downloading system 1 (hereinafter, called "downloading system 1") according to the present embodiment includes: the higher-level device 2 such as a host computer, and the card reader 3 connected in such a way as to be able to communicate with the higher-level device 2. The downloading system 1 downloads firmware program data 4 (Refer to FIG. 2) for operating the card reader 3 from the higher-level device 2 to the card reader 3.

In the present embodiment, a card reader 3A as a new model of the card reader 3, and a card reader 3B as an old model of the card reader 3, which is older than the new-model card reader 3A, are able to be connected to the higher-level device 2; the new-model card reader 3A having been produced either for the purpose of a functional improvement, or in order to cope with a discontinuation of manufacturing a component used in the card reader. Then, for example, either of the card reader 3A or the card reader 3B is connected to the higher-level device 2. The card reader 3A of the present embodiment is a peripheral, while the card reader 3B is a second peripheral.

The higher-level device 2 includes a download control unit 5 that conducts control over downloading the program data 4 to the card reader 3. The download control unit 5 is composed of a communication means and a control program and the like in the higher-level device 2. In the meantime, the higher-level device 2 is equipped with an external storage device 6 such as a hard disc drive. A download file 7 including the program data 4 is stored in the external storage device 6. In the present embodiment, either of a download file 7A (Refer to (A) and (C) of FIG. 3) including the program data 4 compatible with the card reader 3A, or a download file 7B (Refer to (B) and (D) of FIG. 3) including the program data 4 compatible with the card reader 3B, is stored in the external storage device 6.

The card reader 3 is, for example, either a manual-type card reader for reading magnetic data recorded in a card, and the like, while the card being manually transferred; or a card-transfer-type card reader for reading magnetic data recorded in a card, and the like, while the card being transferred by a card transfer mechanism.

The card reader 3A is equipped with a card reader control unit 8 that controls the card reader 3A. The card reader control unit 8 includes a storage means such as a ROM, a RAM, a non-volatile memory, and the like; and moreover a computation means such as a CPU and the like. The card reader control unit 8 further includes a rewrite control unit 9 that controls rewriting program data stored in the card reader 3A, and a firmware storage unit 10 in which firmware including the program data is stored (kept in a memory device).

The card reader 3B is equipped with a card reader control unit 13 that controls the card reader 3B. The card reader control unit 13 includes a storage means such as a ROM, a RAM, a non-volatile memory, and the like; and moreover a computation means such as a CPU and the like. The card reader control unit 13 further includes a rewrite control unit 14 that controls rewriting program data stored in the card reader 3B, and a firmware storage unit 15 in which firmware including the program data is stored.

Written in the download file 7 are revision information 17 with respect to the program data 4, an erase command 18, a download command 19, and an EOF (End Of File mark: a file-end code) 20, in addition to the program data 4. The revision information 17 is written in a first line in the download file 7, and the erase command 18 is written in a second line in the download file 7. The download command 19 and the program data 4 are written in a third line and its following line in the download file 7; and then the EOF 20 is written in a final line in the download file 7.

The revision information 17 is information on a revision history of the program data 4 in the download file 7. A format of the revision information 17 is, for example, the same as a format of a response (reply) from the card reader 3, the response being acquired at a time when the higher-level device 2 issues the card reader 3 with a revision acquisition command with respect to the program data. The revision acquisition command is a command for acquiring the revision information with respect to the program data stored in the card reader 3.

The erase command 18 is a command for deleting (erasing) a specified area in the firmware storage unit 10 or 15 of the card reader 3.

Each line of the program data 4, in the third line and its following line of the download file 7, is shaped beforehand in a specified data format and data length in conformity with a communication protocol between the higher-level device 2 and the card reader 3, and moreover it is set with the download command 19. Furthermore, rewriting permit data 22 for having the rewrite control unit 9 permit the program data stored in the card reader 3A to be rewritten with the program data 4 of the download file 7A stored in the external storage device 6 is described in the program data 4 of the third line in the download file 7A including the program data 4 compatible with the card reader 3A. On the other hand, the rewriting permit data 22 is not described in the program data 4 of the third line in the download file 7B including the program data 4 compatible with the card reader 3B. Incidentally, the rewriting permit data 22 may be described as an encoded cryptogram in the program data 4, or otherwise may be described as a plain text not encoded, in the program data 4.

As described above, the card reader 3A and the card reader 3B can be connected to the higher-level device 2. In the meantime, in the external storage device 6, either the download file 7A including the program data 4 compatible with the card reader 3A, or the download file 7B including the program data 4 compatible with the card reader 3B is stored. Therefore, with respect to a combination of the card reader 3 to be connected to the higher-level device 2 and the download file 7 to be stored in the higher-level device 2, four patterns as shown in FIG. 3 are conceivable.

More specifically, the four conceivable patterns include: a pattern as shown in FIG. 3 (A) where the card reader 3A is connected to the higher-level device 2, and the download file 7A is stored in the external storage device 6; a pattern as shown in FIG. 3 (B) where the card reader 3A is connected to the higher-level device 2, and the download file 7B is stored in the external storage device 6; a pattern as shown in FIG. 3 (C) where the card reader 3B is connected to the higher-level device 2, and the download file 7A is stored in the external storage device 6; and a pattern as shown in FIG. 3 (D) where the card reader 3B is connected to the higher-level device 2, and the download file 7B is stored in the external storage device 6.

Incidentally, in the case where the download file 7A is stored in the external storage device 6, a revision ID of the program data 4 included in the download file 7A is "Rev. B", for example as shown in FIGS. 3 (A) and (C). Meanwhile, in the case where the download file 7B is stored in the external storage device 6, a revision ID of the program data 4 included in the download file 7B is "Rev. b", for example as shown in FIGS. 3 (B) and (D). On the other hand, a revision ID of the program data stored in the firmware storage unit 10 of the card reader 3A is "Rev. A", for example as shown in FIGS. 3 (A) and (B); and meanwhile, a revision ID of the program data stored in the firmware storage unit 15 of the card reader 3B is "Rev. a", for example as shown in FIGS. 3 (C) and (D).

Moreover, in the present embodiment, even in the case where the program data 4 compatible with the card reader 3A is downloaded to the card reader 3B, the card reader 3B can still normally operate. On the other hand, if the program data 4 compatible with the card reader 3B is downloaded to the card reader 3A, the card reader 3A cannot normally operate.

(Firmware Downloading Method: Processing at Higher-Level Device)

Figure 4:
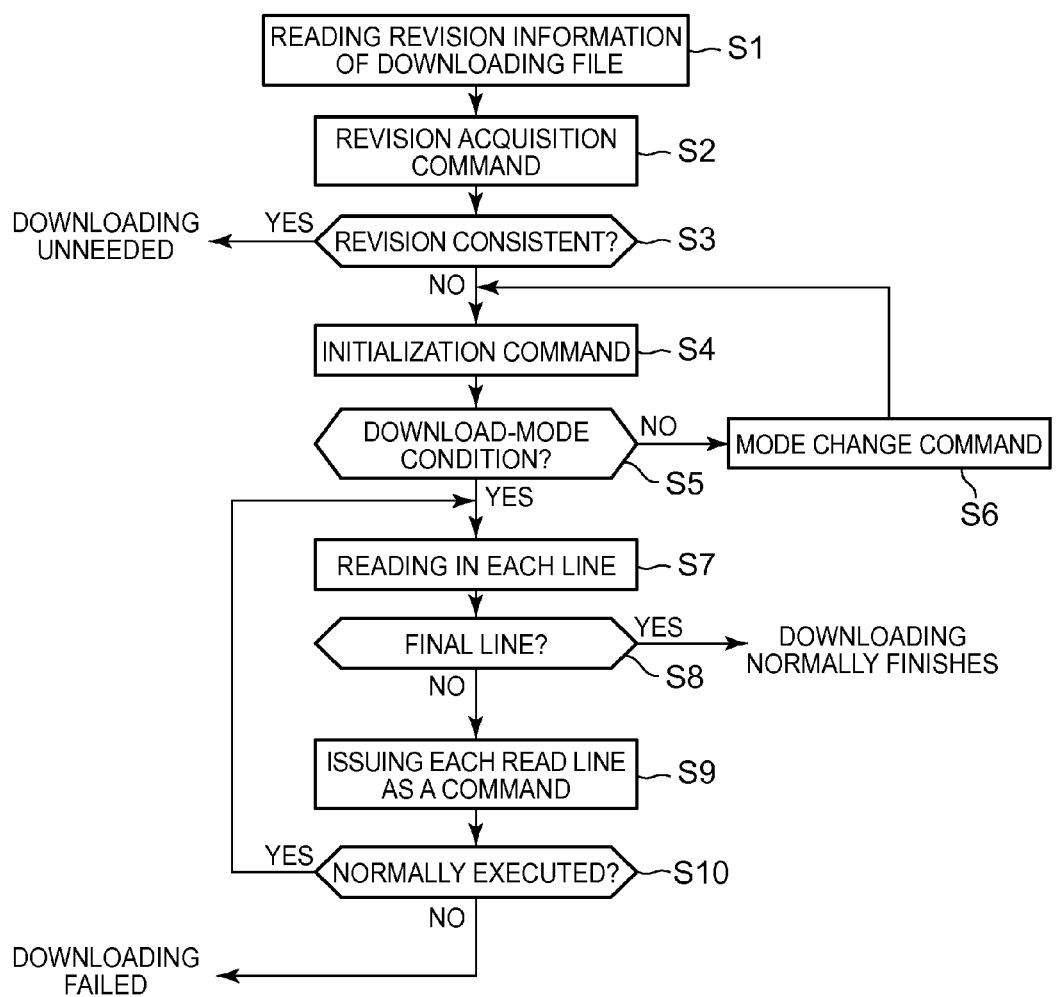
FIG. 4 is a flowchart showing an example of a process flow at a time of downloading a firmware in the higher-level device shown in FIG. 1.

FIG. 4 is a flowchart showing an example of a process flow at a time of downloading a firmware in the higher-level device 2 shown in FIG. 1.

At a time of downloading the program data 4 from the higher-level device 2 to the card reader 3, at first the download control unit 5 reads in the first line of the download file 7 to read the revision information 17 (Step S1), and then issues the card reader 3 with a revision acquisition command (Step S2). After that, the download control unit 5 makes a comparison between the revision information 17 read from the download file 7 and a response from the card reader 3 to the revision acquisition command (Step S3). More specifically, at Step S3, a comparison is made between a revision ID of the program data 4 included in the download file 7 stored in the higher-level device 2 (concretely, the external storage device 6) and a revision ID of the program data stored in the firmware storage unit 10 or 15.

At Step S3, if the revision ID of the program data 4 included in the download file 7 stored in the higher-level device 2 and the revision ID of the program data stored in the firmware storage unit 10 or 15 are not consistent with each other (in the case of "No" at Step S3), the download control unit 5 issues the card reader 3 with an initialization command for execution of downloading (Step S4).

Namely, in the case where the revision ID of the program data 4 included in the download file 7A stored in the higher-level device 2 (concretely, the external storage device 6) is "Rev. B" and the revision ID of the program data stored in the firmware storage unit 10 is "Rev. A" as shown in FIG. 3 (A); in the case where the revision ID of the program data 4 included in the download file 7B stored in the higher-level device 2 is "Rev. b" and the revision ID of the program data stored in the firmware storage unit 10 is "Rev. A" as shown in FIG. 3 (B); in the case where the revision ID of the program data 4 included in the download file 7A stored in the higher-level device 2 is "Rev. B" and the revision ID of the program data stored in the firmware storage unit 15 is "Rev. a" as shown in FIG. 3 (C); and); in the case where the revision ID of the program data 4 included in the download file 7B stored in the higher-level device 2 is "Rev. b" and the revision ID of the program data stored in the firmware storage unit 15 is "Rev. a" as shown in FIG. 3 (D); the revision ID of the program data 4 included in the download file 7 stored in the higher-level device 2 and the revision ID of the program data stored in the firmware storage unit 10 or 15 are not consistent with each other so that, at Step S4, the download control unit 5 issues the card reader 3 with an initialization command.

Then, the download control unit 5 makes a judgment, according to a response from the card reader 3 to the initialization command, on whether or not the card reader 3 is under a download-mode condition (a condition where the program data 4 can be downloaded) (Step S5). If the card reader 3 is not in the download-mode condition at Step S5 (in the case of "No" at Step S5), the download control unit 5 issues the card reader 3 with a mode change command (Step S6) to shift the card reader 3 into the download-mode condition, and then operation returns to Step S4.

On the other hand, if the card reader 3 is in the download-mode condition at Step S5 (in the case of "Yes" at Step S5), the download control unit 5 reads in each of the second line and its following line (Step S7) to make a judgment on whether or not the line read in is a final line (EOF 20) (Step S8).

If the line read in is not a final line at Step S8 (in the case of "No" at Step S8), the download control unit 5 issues the card reader 3 with one line of the download file 7, having been read in, as a command. For example, if the line read in is the second line of the download file 7, an erase command 18 is issued to the card reader 3. Otherwise, if the line read in is the third line or its following line of the download file 7, a download command 19 is issued together with the program data 4, having been shaped, to the card reader 3.

Then, the download control unit 5 makes a judgment, according to a response from the card reader 3, on whether or not the command has normally been executed (Step S10). If the response from the card reader 3 is a normal response (in the case of "Yes" at Step S10), operation returns to Step S7 to read in a next line of the download file 7. On the other hand, if the response from the card reader 3 is an abnormal response (in the case of "No" at Step S10), the download control unit 5 judges that downloading the program data 4 has failed, and finishes the downloading process. Incidentally, in this case, the downloading system 1 may occasionally go down (The downloading system 1 stops its operation).

Meanwhile, if the line read in from the download file 7 is a final line at Step S8 (in the case of "Yes" at Step S8), operation of downloading the program data 4 finishes normally.

In the meantime, at Step S3, if the revision ID of the program data 4 stored in the higher-level device 2 and the revision ID of the program data stored in the firmware storage unit 10 or 15 are consistent with each other (in the case of "Yes" at Step S3), the download control unit 5 judges that downloading the program data 4 is not needed, and finishes the downloading process. For example, if the revision ID of the program data 4 stored in the higher-level device 2 is "Rev. A" in FIG. 3 (A), the revision ID of the program data 4 stored in the higher-level device 2 and the revision ID of the program data stored in the firmware storage unit 10 are consistent with each other, so that the download control unit 5 finishes the downloading process.

(Firmware Downloading Method: Processing at Card Reader)

Figure 5:
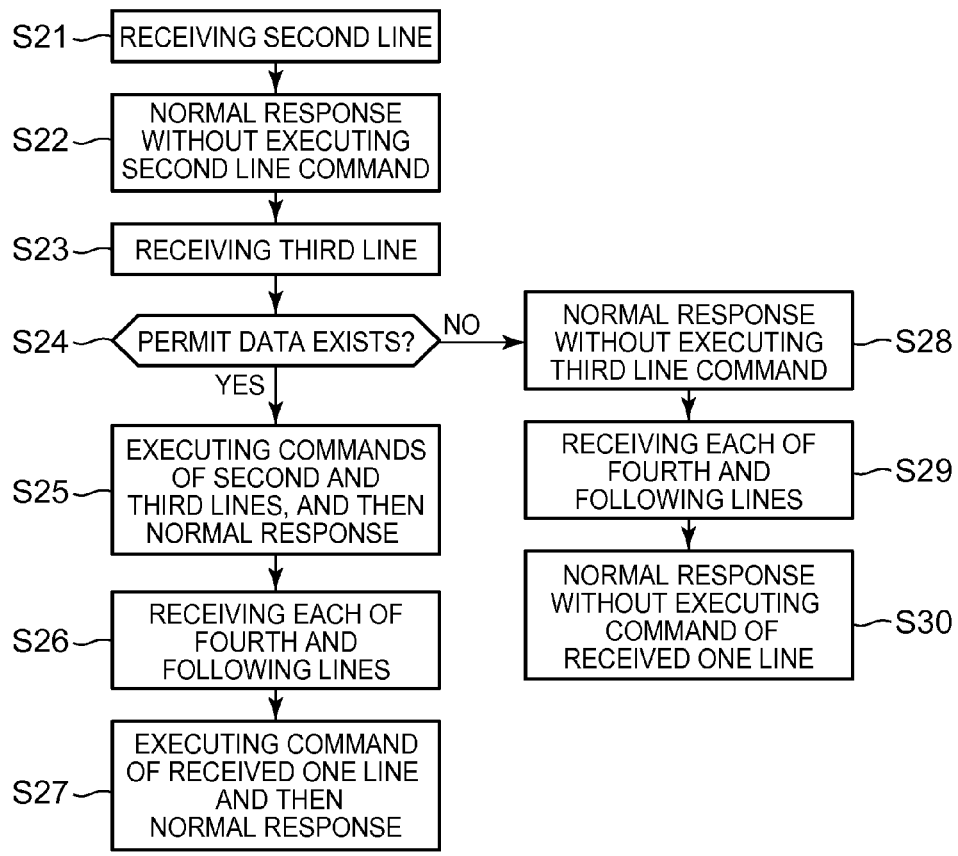
FIG. 5 is a flowchart showing an example of a process flow at a time of downloading a firmware in the card reader shown in FIG. 1.

FIG. 5 is a flowchart showing an example of a process flow at a time of downloading a firmware in the card reader 3 shown in FIG. 1.

In the case where the card reader 3B is connected to the higher-level device 2 as shown in FIGS. 3 (C) and (D), the card reader 3B carries out the same process as a process that a card reader described in Patent Document 1 mentioned above does, at the time of downloading the firmware, regardless of whether the download file 7A or the download file 7B is stored in the higher-level device 2.

More specifically, if one line read in at Step S7 mentioned above is the second line of the download file 7, the card reader control unit 13 executes the erase command 18, on the basis of the erase command 18 issued at Step S9. Concretely, the rewrite control unit 14 erases a designated area in the firmware storage unit 15. More concretely, the rewrite control unit 14 erases program data in the firmware storage unit 15, which is corresponding to the program data 4. Meanwhile, the card reader control unit 13 returns a normal response, notifying that the erase command 18 has normally been executed, to the download control unit 5.

In the meantime, if one line read in at Step S7 is the third line or its following line of the download file 7, the card reader control unit 13 executes download command 19, on the basis of download command 19 issued at Step S9. Concretely, the rewrite control unit 14 stores (keeps in a memory device) the program data 4 sent from the higher-level device 2, in a designated area in the firmware storage unit 15. Namely, the rewrite control unit 14 writes the program data 4 sent from the higher-level device 2, in the firmware storage unit 15. In the meantime, the rewrite control unit 14 returns a normal response, notifying that the download command 19 has normally been executed, to the download control unit 5.

Meanwhile, in the case where the card reader 3A is connected to the higher-level device 2 as shown in FIGS. 3 (A) and (B), the card reader 3A carries out a process being different from a process that a card reader described in Patent Document 1 mentioned above does, at the time of downloading the firmware. Concretely, the card reader 3A carries out the process as below, in accordance with the flowchart shown in FIG. 5.

If one line read in at Step S7 mentioned above is the second line of the download file 7, at the time when the rewrite control unit 9 receives the second line of the download file 7 issued at Step S9 (namely, the erase command 18) (Step S21), the rewrite control unit 9 returns a normal response, notifying that the erase command 18 has normally been executed, to the download control unit 5 without executing the erase command 18 of the second line (Step S22). In other words, at Step S22, the rewrite control unit 9 returns a normal response, notifying that the erase command 18 has normally been executed, to the download control unit 5, without erasing the program data stored in the firmware storage unit 10.

After that, at the time when the rewrite control unit 9 receives (Step S23) the third line of the download file 7 (namely, the download command 19 and the program data 4) issued at Step S9, the rewrite control unit 9 makes a judgment on whether or not the rewriting permit data 22 is described in the program data 4 of the third line (Step S24). Namely, at Step S24, the rewrite control unit 9 judges whether or not the program data 4 stored in the higher-level device 2 is the program data 4 compatible with the card reader 3A.

Figure 3A:
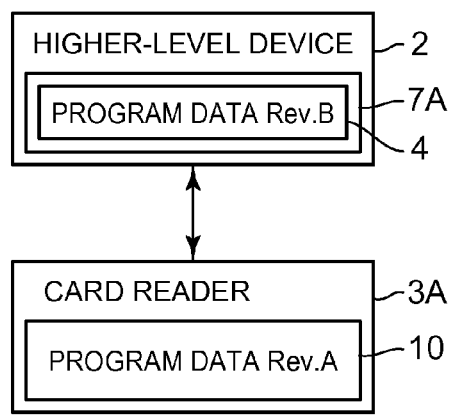
FIGS. 3A-3D are conceptual diagrams for explaining combination patterns of a card reader connected to the higher-level device, shown in FIG. 1, and the download file stored in the higher-level device.

In the case where the rewriting permit data 22 is described in the program data 4 of the third line at Step S24; while the download file 7A is stored in the higher-level device 2, as shown in FIG. 3A (in other words, the download file 7 includes the rewriting permit data 22, such that "Yes" is given at Step S24); the rewrite control unit 9 executes the command of the second line and the command of the third line of the download file 7A (namely, the erase command 18 and the download command 19), and then returns a normal response, notifying that the download command 19 has normally been executed, to the download control unit 5 (Step S25). Concretely, at Step S25, the rewrite control unit 9 erases the program data stored in the firmware storage unit 10, stores (keeps in a memory device) the program data 4 sent from the higher-level device 2, in a designated area in the firmware storage unit 10, and then returns the normal response to the download control unit 5.

After that, the rewrite control unit 9 sequentially receives a fourth line and its following line of the download file 7A (Step S26), sequentially executes the download command 19 of the received line (namely, stores (keeps in a memory device) the program data 4 sent from the higher-level device 2, in a designated area in the firmware storage unit 10), and then returns a normal response, notifying that the download command 19 has normally been executed, to the download control unit 5 (Step S27).

Figure 3B:
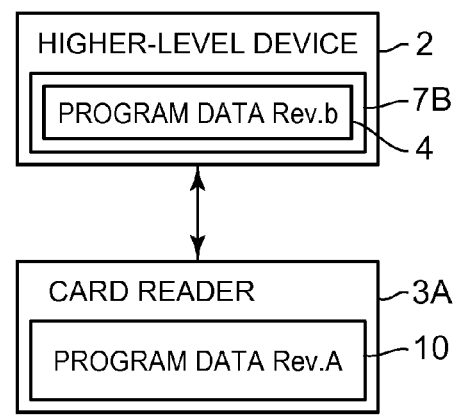
Figure 3C:
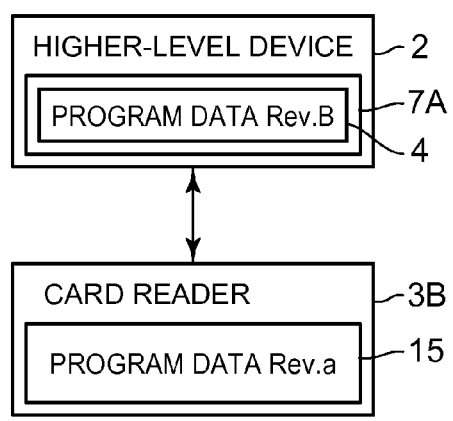
Figure 3D:
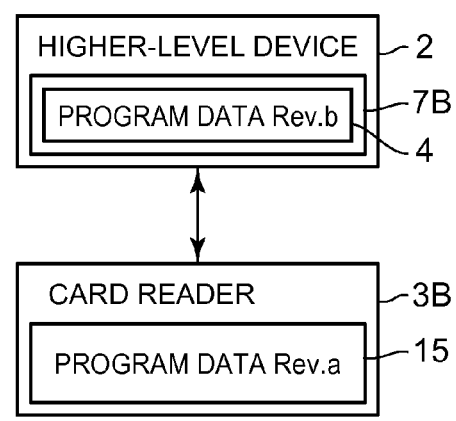

Meanwhile, in the case where the rewriting permit data 22 is not described in the program data 4 of the third line at Step S24; while the download file 7B is stored in the higher-level device 2, as shown in FIG. 3B (in other words, the download file 7 does not include the rewriting permit data 22, such that "No" is given at Step S24); the rewrite control unit 9 returns a normal response, notifying that the download command 19 has normally been executed, to the download control unit 5 without executing the command of the third line of the download file 7B (namely, the download command 19) (Step S28). Concretely, at Step S28, the rewrite control unit 9 returns the normal response to the download control unit 5, without storing (keeping in a memory device) the program data 4 sent from the higher-level device 2, in the firmware storage unit 10.

After that, the rewrite control unit 9 sequentially receives a fourth line and its following line of the download file 7B (Step S29), and returns a normal response, notifying that the download command 19 has normally been executed, to the download control unit 5 (Step S30), without executing the download command 19 of the received line.

Step S24 of the present embodiment is a rewriting permit judgment step for judging whether or not the download file 7 includes the rewriting permit data 22. Meanwhile, Step S25 and Step S27 of the present embodiment are each a rewriting step for rewriting the program data stored in the card reader 3A, by use of the program data 4 sent from the higher-level device 2; and returning the response, notifying that data rewriting has normally been completed, to the higher-level device 2; in the case where the download file 7 includes the rewriting permit data 22. Moreover, Step S28 and Step S30 of the present embodiment are each a pseudo rewriting step for returning the response, notifying that data rewriting has normally been completed, to the higher-level device 2 without rewriting the program data stored in the card reader 3A, by use of the program data 4 sent from the higher-level device 2; in the case where the download file 7 does not include the rewriting permit data 22.

Primary Advantageous Effect of the Present Embodiment

As described above, in the present embodiment, although the program data stored in the card reader 3A is rewritten by use of the program data 4 sent from the higher-level device 2, in the case where the download file 7 includes the rewriting permit data 22; meanwhile, in the case where the download file 7 does not include the rewriting permit data 22, the program data stored in the card reader 3A is not rewritten by use of the program data 4 sent from the higher-level device 2. Namely, in the present embodiment, although the program data stored in the card reader 3A is rewritten by use of the program data 4 sent from the higher-level device 2, in the case where the program data 4 compatible with the card reader 3A is stored in the higher-level device 2; meanwhile, in the case where the program data 4 compatible with the card reader 3B is stored in the higher-level device 2, the program data stored in the card reader 3A is not rewritten by use of the program data 4 sent from the higher-level device 2. Therefore, according to the present embodiment, it is possible to prevent the program data 4, compatible with the old-model card reader 3B, from being downloaded out of the higher-level device 2 to the new-model card reader 3A. Accordingly, in the present embodiment, it becomes possible to protect the card reader 3A from a malfunction of working improperly, which is caused by way of downloading the program data 4, compatible with the old-model card reader 3B, to the card reader 3A.

In the present embodiment, even when the download file 7 does not include the rewriting permit data 22 so that the program data stored in the card reader 3A is not rewritten by use of the program data 4 sent from the higher-level device 2 (in other words, even when the rewrite control unit 9 does not execute the erase command 18 and the download command 19), the rewrite control unit 9 returns the response, notifying that data rewriting has normally been completed, to the higher-level device 2. Therefore, the downloading operation of the higher-level device 2 can normally finish even without downloading the program data 4 from the higher-level device 2 to the card reader 3A. Accordingly, in the present embodiment, it becomes possible to prevent the downloading system 1 from going down.

In the present embodiment, if the card reader 3B is connected to the higher-level device 2, the card reader 3B rewrites the program data stored in the card reader 3B by use of the program data 4 sent from the higher-level device 2, without judging whether or not the download file 7 includes the rewriting permit data 22. Therefore, when the program data 4 compatible with the card reader 3A is stored in the higher-level device 2, the card reader 3B can be operated by use of the program data 4. Namely, in the present embodiment, the card reader 3A and the card reader 3B can be operated by the program data 4, being single program data compatible with the card reader 3A.

In the meantime, if the program data 4 compatible with the card reader 3B is stored in the higher-level device 2, the program data 4 is downloaded to the card reader 3B and it is not downloaded to the card reader 3A. As a result, it is possible to operate the card reader 3A by use of the program data compatible with the card reader 3A, and to operate the card reader 3B by use of the program data compatible with the card reader 3B. Therefore, in the present embodiment, even if only the program data 4, being single program data, is stored in the higher-level device 2, it becomes possible to appropriately operate the card reader 3A and the card reader 3B.

In this manner, according to the present embodiment, it becomes possible to appropriately operate the card reader 3A and the card reader 3B even if only the program data 4, being single program data, is stored in the higher-level device 2, and therefore the higher-level device 2 does not need to have any modification being dependent on whether the card reader 3A or the card reader 3B is connected to the higher-level device 2. Therefore, according to the present embodiment, convenience of a user using the downloading system 1 can be enhanced.

(Modification on Download File and Method of Downloading)

Figure 6:
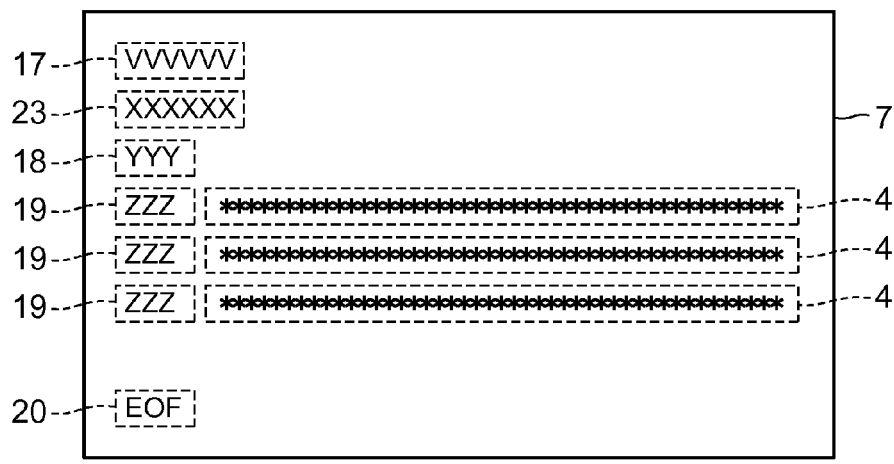
FIG. 6 is a conceptual diagram showing an example of a data structure of a download file according to another embodiment of the present invention.
Figure 7:
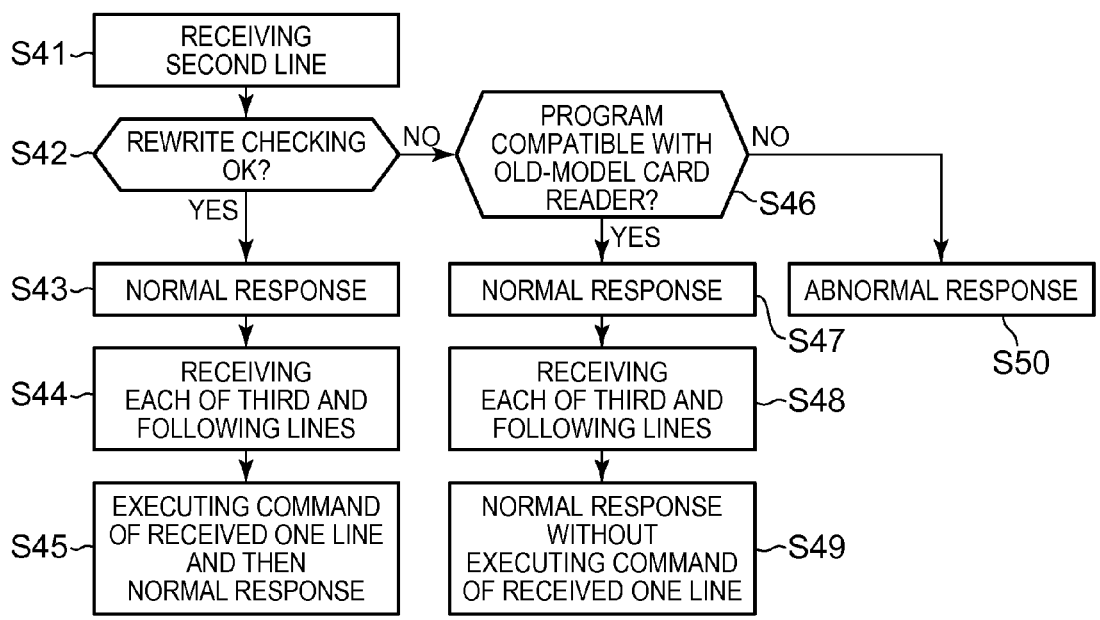
FIG. 7 is a flowchart showing an example of a process flow at a time of downloading a firmware in a card reader according to another embodiment of the present invention.

FIG. 6 is a conceptual diagram showing an example of a data structure of the download file 7 according to another embodiment of the present invention. FIG. 7 is a flowchart showing an example of a process flow at a time of downloading a firmware in a card reader 3 according to another embodiment of the present invention.

Although, in the embodiment described above, the download file 7 does not include a rewrite checking command 23 for determining whether or not the program data stored in the card reader 3 can be rewritten by use of the program data 4 stored in the higher-level device 2, the download file 7 may include the rewrite checking command 23, as shown in FIG. 6. In that case, for example, rewriting permit data is attached to the rewrite checking command 23, the rewriting permit data making the rewrite control unit 9 or 14 permit rewriting the program data stored in the card reader 3 by use of the program data 4 stored in the external storage device 6. Moreover, the rewriting permit data attached to the rewrite checking command 23 of the download file 7A and the rewriting permit data attached to the rewrite checking command 23 of the download file 7B are different from each other.

In the download file 7 according to the modification example, the rewrite checking command 23 is written in the second line of the download file 7, the erase command 18 is written in the third line of the download file 7, and the download command 19 and the program data 4 are written in the fourth and its following lines, as shown in FIG. 6. In the meantime, the rewrite control unit 9 stores permit data that is either consistent with the rewriting permit data attached to the rewrite checking command 23 of the download file 7A, or corresponding to the rewriting permit data one-on-one; and meanwhile the rewrite control unit 14 stores permit data that is either consistent with the rewriting permit data attached to the rewrite checking command 23 of the download file 7B, or corresponding to the rewriting permit data one-on-one.

In the modification example, as shown in FIG. 7; if the rewrite control unit 9 receives the second line of the download file 7 (namely, the rewrite checking command 23) issued at Step S9 described above (Step S41), the rewrite control unit 9 judges whether or not the rewriting permit data attached to the rewrite checking command 23 is consistent with the permit data stored in the rewrite control unit 9 (or corresponding to the permit data) (Step S42). In other words, the rewrite control unit 9 judges at Step S42 whether a rewrite check is verified or not.

In the case where the download file 7A is stored in the higher-level device 2, and the rewrite check is verified at Step S42 (in the case of "Yes" at Step S42), the rewrite control unit 9 returns a normal response, notifying that the rewrite check has been verified, to the download control unit 5 (Step S43). After that, the rewrite control unit 9 sequentially receives a third line and its following line of the download file 7A (Step S44), sequentially executes the erase command 18 and the download command 19 of the received line, and then returns a normal response, notifying that the erase command 18 and the download command 19 have normally been executed, to the download control unit 5 (Step S45).

On the other hand, in the case where the rewrite check is not verified at Step S42 (in the case of "No" at Step S42), the rewrite control unit 9 makes a judgment on whether the rewriting permit data attached to the rewrite checking command 23 is the rewriting permit data attached to the rewrite checking command 23 of the download file 7B, or rewriting permit data attached to a rewrite checking command of a download file of any other type of card reader and the like (Step S46). In other words, at Step S46, the rewrite control unit 9 judges whether the program data stored in the higher-level device 2 is compatible with the old-model card reader 3B, or compatible with any other type of card reader and the like.

At Step S46, if the program data stored in the higher-level device 2 is compatible with the card reader 3B (namely, the download file 7B is stored in the higher-level device 2, such that "Yes" is given at Step S46), the rewrite control unit 9 returns a normal response, notifying that the rewrite check has been verified, to the download control unit 5 even though the rewrite check has actually not been verified (Step 47). After that, the rewrite control unit 9 sequentially receives a third line and its following line of the download file 7B (Step S48), and returns a normal response, notifying that the erase command 18 and the download command 19 have normally been executed, to the download control unit 5, without executing the erase command 18 and the download command 19 of the received line (Step S49).

On the other hand, at Step S46, if the program data stored in the higher-level device 2 is compatible with any other type of card reader and the like ("No" at Step S46), the rewrite control unit 9 returns an abnormal response to the download control unit 5 (Step S50). Having received the abnormal response, the download control unit 5 judges that downloading the program data 4 has failed, and finishes the downloading process.

Also in this modification example, the same effect can be made as it is in the embodiment described above. Moreover, in this modification example, the program data 4 does not need to include the rewriting permit data 22 so that a configuration of the program data 4 can be simplified. Incidentally, when the program data 4 includes the rewriting permit data 22, it becomes possible to judge whether or not the download file 7 includes rewriting permit data, even in the case where the download file 7 does not include the rewrite checking command 23, or the card reader 3A does not accept the rewrite checking command 23.

Incidentally, Step S42 in this modification example is a rewriting permit judgment step for judging whether or not the download file 7 includes the rewriting permit data in order to make the rewrite control unit 9 permit rewriting the program data stored in the card reader 3A by use of the program data 4 stored in the higher-level device 2. Meanwhile, Step S45 is a rewriting step for rewriting the program data stored in the card reader 3A, by use of the program data 4 sent from the higher-level device 2; and returning the response, notifying that data rewriting has normally been completed, to the higher-level device 2; in the case where the download file 7 includes the rewriting permit data in order to make the rewrite control unit 9 permit rewriting the program data stored in the card reader 3A by use of the program data 4 stored in the higher-level device 2. Moreover, Step S49 is a pseudo rewriting step for returning the response, notifying that data rewriting has normally been completed, to the higher-level device 2 without rewriting the program data stored in the card reader 3A, by use of the program data 4 sent from the higher-level device 2; in the case where the download file 7 does not include the rewriting permit data in order to make the rewrite control unit 9 permit rewriting the program data stored in the card reader 3A by use of the program data 4 stored in the higher-level device 2.

Other Embodiments

The embodiment and modification described above is an example of a preferred embodiment according to the present invention, and an embodiment of the present invention is not limited to the above embodiment and modification, and various variations can be made without changing the concept of the present invention.

In the embodiment described above, the rewriting permit data 22 is written in the program data 4 of the third line of the download file 7A. As another possibility, for example, the rewriting permit data 22 may be written in the program data 4 of an n-th line of the fourth and its following lines of the download file 7A. In that case, after judging whether or not the rewriting permit data 22 is written in the program data 4 of the n-th line, the rewrite control unit 9 returns a normal response to the download control unit 5, with or without executing commands of the second line down to the n-th line.

In the embodiment described above, each of the peripheral and the second peripheral connected in such a way as to be able to communicate with the higher-level device 2 is a card reader 3; and meanwhile alternatively, each of the peripheral and the second peripheral connected in such a way as to be able to communicate with the higher-level device 2 may be various devices other than the card reader 3, such as a card printer and the like.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A peripheral, to be connected to a higher-level device, to which firmware program data for operating the peripheral can be downloaded from the higher-level device; the peripheral comprising:
   a rewrite control unit for controlling rewriting of the program data stored in the peripheral;
   wherein the peripheral is configured such that, in the case where a download file, which includes the program data and is stored in the higher-level device, includes rewriting permit data for giving the rewrite control unit permit to rewrite the program data stored in the peripheral by use of the program data stored in the higher-level device, the program data stored in the peripheral is rewritten by use of the program data sent from the higher-level device, and then a response, notifying that data rewriting has normally been completed, is returned to the higher-level device; and
   wherein the peripheral is configured such that, in the case where the download file does not include the rewriting permit data, a response, notifying that data rewriting has normally been completed, is returned to the higher-level device, without rewriting the program data stored in the peripheral by use of the program data sent from the higher-level device.

2. A method of controlling a peripheral, to be connected to a higher-level device, to which firmware program data for operating the peripheral can be downloaded from the higher-level device, the method comprising:
   judging whether or not a download file, which includes the program data and is stored in the higher-level device, includes a rewriting permit data for giving a permit of rewriting the program data stored in the peripheral by use of the program data stored in the higher-level device;
   rewriting the program data stored in the peripheral by use of the program data sent from the higher-level device and returning a response, notifying that data rewriting has normally been completed, to the higher-level device in the case where the download file includes the rewriting permit data at the rewriting permit judgment step; and
   returning a response, notifying that data rewriting has normally been completed, to the higher-level device without rewriting the program data stored in the peripheral by use of the program data sent from the higher-level device in the case where the download file does not include the rewriting permit data at the rewriting permit judgment step.

3. A firmware downloading system comprising:
   a higher level device;
   a peripheral connected to the higher level device;
   wherein the peripheral and the higher level device are configured such that firmware program data for operating the peripheral is downloaded from the higher-level device and stored in the peripheral;
   wherein the peripheral comprises:
      a rewrite control unit for controlling rewriting the program data stored in the peripheral;
      wherein the peripheral is configured such that, in the case where a download file, which includes the program data and is stored in the higher-level device, includes rewriting permit data for giving the rewrite control unit permit to rewrite the program data stored in the peripheral by use of the program data stored in the higher-level device, the program data stored in the peripheral is rewritten by use of the program data sent from the higher-level device, and then a response, notifying that data rewriting has normally been completed, is returned to the higher-level device; and
      wherein the peripheral is configured such that, in the case where the download file does not include the rewriting permit data, a response, notifying that data rewriting has normally been completed, is returned to the higher-level device, without rewriting the program data stored in the peripheral by use of the program data sent from the higher-level device.

4. The firmware downloading system according to claim 3; wherein the rewriting permit data is included in the program data of the download file.

5. The firmware downloading system according to claim 3; wherein the download file includes a rewrite checking command for determining whether or not the program data stored in the peripheral can be rewritten by use of the program data stored in the higher-level device; and the rewriting permit data is attached to the rewrite checking command.

6. The firmware downloading system according to claim 3; wherein a second peripheral, which is a model older than the peripheral, is connected to the higher-level device; and
   in the second peripheral, the program data stored in the second peripheral is rewritten by use of the program data sent from the higher-level device, without judging whether or not the download file includes the rewriting permit data.

* * * * *